United States Patent
Ji et al.

(10) Patent No.: US 11,200,333 B2
(45) Date of Patent: Dec. 14, 2021

(54) FILE EXPOSURE TO AN INTENDED RECIPIENT

(71) Applicant: International Business Machines Corporation, Armonk, NY (US)

(72) Inventors: Mo Ji, Beijing (CN); Shan Gao, Beijing (CN); Cheng Xu, Beijing (CN); Cheng Fang Wang, Beijing (CN); Ya Nan Mo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 16/539,632

(22) Filed: Aug. 13, 2019

(65) Prior Publication Data

US 2021/0049290 A1    Feb. 18, 2021

(51) Int. Cl.
*G06F 21/62* (2013.01)
*G06F 21/32* (2013.01)
*H04L 9/08* (2006.01)

(52) U.S. Cl.
CPC .......... *G06F 21/6218* (2013.01); *G06F 21/32* (2013.01); *H04L 9/0825* (2013.01); *G06F 2221/2141* (2013.01)

(58) Field of Classification Search
CPC ................. G06F 21/6218; G06F 21/32; G06F 2221/2141; H04L 9/0825; H04L 9/14; H04L 9/0866; H04W 12/00
See application file for complete search history.

(56) References Cited

U.S. PATENT DOCUMENTS

| | | | | |
|---|---|---|---|---|
| 9,411,379 B2* | 8/2016 | Rinner | ............... | G03B 11/041 |
| 9,525,668 B2* | 12/2016 | Bhargav-Spantzel | | ....................... H04L 9/3234 |
| 10,219,517 B2* | 3/2019 | Amaki | ..................... | C12N 1/20 |
| 2011/0264919 A1* | 10/2011 | Pizano | ............... | H04L 63/0861 713/186 |
| 2014/0333544 A1* | 11/2014 | Mankowski | ........ | G06F 3/04164 345/173 |

(Continued)

FOREIGN PATENT DOCUMENTS

| CN | 101430747 A | 9/2011 |
|---|---|---|
| CN | 105447532 A | 3/2016 |

(Continued)

OTHER PUBLICATIONS

Gershgorn Dave, Nov. 27, 2017, QZ.com, https://qz.com/1139144/google-can-tell-if-someone-is-looking-at-your-phone-over-your-shoulder/.*

(Continued)

*Primary Examiner* — Shanto Abedin
(74) *Attorney, Agent, or Firm* — Edward Li

(57) ABSTRACT

A method, computer system, and computer program product for file exposure to an intended recipient. A computer system receives a request to view a file is received first, wherein the file is encrypted with a first key generated based on at least one biological feature of an intended recipient. The computer system causes at least one biological feature of a viewer to be captured, wherein the at least one biological feature of the viewer is corresponding to the at least one biological feature of the intended recipient. The computer system generates a second key based on the at least one biological feature of the viewer. The computer decrypts the file with the second key.

25 Claims, 10 Drawing Sheets

(56) References Cited

U.S. PATENT DOCUMENTS

| | | | |
|---|---|---|---|
| 2015/0269389 A1* | 9/2015 | Lee | H04L 63/0428 |
| | | | 713/164 |
| 2016/0100314 A1* | 4/2016 | Chung | H04W 12/06 |
| | | | 713/186 |
| 2018/0063091 A1* | 3/2018 | Lancioni | H04L 63/20 |
| 2018/0330519 A1* | 11/2018 | Finn | G06K 9/00597 |
| 2019/0108200 A1* | 4/2019 | Nambannor Kunnath | |
| | | | G06F 40/143 |
| 2019/0243989 A1* | 8/2019 | Kalva | H04L 63/101 |

FOREIGN PATENT DOCUMENTS

| | | | |
|---|---|---|---|
| CN | 105205415 A | 3/2018 | |
| CN | 106330440 A | 5/2019 | |
| CN | 105099669 A | 7/2019 | |
| WO | 2013131407 A1 | 9/2013 | |
| WO | 2017166652 A1 | 10/2017 | |
| WO | 2018032661 A1 | 2/2018 | |

OTHER PUBLICATIONS

International Search Report and Written Opinion, International Application No. PCT/IB2020/057571, International Filing Date Aug. 12, 2020.

Cao, Xiong, "A Face Feature Encryption Algorithm Based on Fuzzy Extraction", Master Degree Dissertation in Engineering, Harbin University of Science and Technology, Mar. 2012, Abstract only, 3 pages, <http://www.wanfangdata.com.cn/details/detail.do?_type=degree&id=Y2280447>.

Fu, Bo, "Error-Tolerant generation of biometric key from face features", Application Research of Computers, vol. 25, No. 1, Jan. 2008, Abstract only, 3 pages.

Mell et al., "The NIST Definition of Cloud Computing", National Institute of Standards and Technology, Special Publication 800-145, Sep. 2011, 7 pages.

\* cited by examiner

FILE EXPOSURE TO AN INTENDED RECIPIENT

BACKGROUND

The present invention relates generally to the field of computer software. More particularly, they relate to methods, systems, and computer program products for file exposure to an intended recipient.

File sharing is widely used nowadays. Some technologies have been implemented to provide control for file sharing, such as file encryption, burn after reading, download preventing and screenshot preventing, and the like.

An illegal exposure of files may lead to disclosure of privacy or confidential information. The root causes of the illegal exposure of files can be classified as below. (1) Others access the files illegally. (2) The intended recipient shares the files to others by some actions through an electronic device, such as cutting or copying contents of the files to a clipboard and then pasting the contents in the clipboard to new files, sending or forwarding the files, screenshots of the files and the like. (3) The intended recipient shares the files to others by some actions through physical behavior, such as taking photos of the files; speaking out the files to others, letting others view the files on the screen, and the like. (4) Others peek at the files when the intended recipient is reading the file on the screen.

Existing technologies for files sharing control, such as file encryption, burn after reading, download preventing and screenshot preventing, and the like, cannot prevent unauthorized persons well from knowing contents of files. For example, the file encryption can prevent others from getting contents of an encrypted file. However, if others get the decrypted key of the encrypted file, they can get the contents of the file. If the file is encrypted asymmetrically, a third party have to be involved to provide the public key as well as the private key for an intended recipient. It makes the communication complex; thus, the asymmetric encryption is not suitable for general file sharing in social network.

U.S. Pat. Pub. No. 2016/0100314 A1 (Chung, 2016) discloses a method for accessing encrypted and decrypted data sent between a sender mobile device with a mobile App to a user mobile device with the mobile App. This disclosed method needs a validation server to process the sender selected biometric feature to generate a public key and send the public key back to sender for encryption. It requires data (receiver's biometric feature and public key) exchange between the sender and the server in a network. Furthermore, the disclosed method requires the generation of public and private keys from the server. The public key (encryption key) can be generated based on the biometric feature, but private key (decryption key) is not generated from the biometric feature. The video taken is just used for the comparison with a stored biometric feature for authentication to access the private key from the server.

U.S. Pat. No. 9,525,668 (Bhargav-Spantzel, 2016) discloses a system including at least one core and a trusted execution environment to conduct an identity authentication that includes a comparison of streamed video data with previously recorded image data. The disclosed system uses an extra service/server to validate user's identity from a live video and establish a secure messaging channel. A facial feature is not used for encryption and decryption but only for authentication to gain biometric-feature-unrelated keys from the server to build up a secure messaging channel.

SUMMARY

In one aspect, a computer-implemented method for file exposure to an intended recipient is provided. The computer-implemented method includes receiving, by a computer system, a request to view an encrypted file, wherein the encrypted file that is encrypted with a first key generated based on at least one biological feature of an intended recipient. The computer-implemented method further includes causing, by the computer system, at least one biological feature of a viewer to be captured, wherein the at least one biological feature is corresponding to the at least one biological feature of the intended recipient. The computer-implemented method further includes generating, by the computer system, a second key based on the at least one biological feature of the viewer. The computer-implemented method further includes decrypting, by the computer system, the encrypted file with the second key.

In another aspect, a computer system for file exposure to an intended recipient is provided. The computer system includes one or more processors, one or more computer readable tangible storage devices, and program instructions stored on at least one of the one or more computer readable tangible storage devices for execution by at least one of the one or more processors. The program instructions are executable to perform: receiving a request to view an encrypted file, wherein the encrypted file that is encrypted with a first key generated based on at least one biological feature of an intended recipient; causing at least one biological feature of a viewer to be captured, wherein the at least one biological feature is corresponding to the at least one biological feature of the intended recipient; generating a second key based on the at least one biological feature of the viewer; and decrypting the encrypted file with the second key.

In yet another aspect, a computer program product for file exposure to an intended recipient is provided. The computer program product comprises one or more computer-readable tangible storage devices and program instructions stored on at least one of the one or more computer-readable tangible storage devices. The program instructions are executable to perform receiving a request to view an encrypted file, wherein the encrypted file that is encrypted with a first key generated based on at least one biological feature of an intended recipient. The program instructions are further executable to perform causing at least one biological feature of a viewer to be captured, wherein the at least one biological feature is corresponding to the at least one biological feature of the intended recipient. The program instructions are further executable to perform generating a second key based on the at least one biological feature of the viewer. The program instructions are further executable to perform decrypting the encrypted file with the second key.

In one embodiment of the present invention, the at least one biological feature of the intended recipient and the at least one biological feature of the viewer are selected from the group consisting of: a facial feature, an iris feature, a fingerprint feature, and a voiceprint feature.

In another embodiment of the present invention, the encrypted file comprises a piece of ciphertext which is generated by encrypting predefined information using the first key. The computer system decrypts the piece of ciphertext with the second key to get decrypted information. The computer system compares the decrypted information with the predefined information. The computer system determines that the encrypted file is able to be decrypted with the second key, in response to the decrypted information is the same as the predefined information.

In yet another embodiment of the present invention, the computer system rejects the request to view the encrypted file by the viewer, in response to the encrypted file being not able to be decrypted with the second key.

In yet another embodiment of the present invention, the encrypted file is decrypted into a memory.

In yet another embodiment of the present invention, the causing the at least one biological feature of the viewer to be captured includes: causing, by the computer system, at least one picture of the viewer to be captured; detecting, by the computer system, occurrence of the viewer in the at least one picture; determining, by the computer system, at least one facial feature of the viewer corresponding to at least one facial feature of the intended recipient, from the at least one picture of the viewer.

In yet another embodiment of the present invention, the computer system causes a video of the viewer to be captured, in response to the encrypted file being decrypted into a decrypted file. The computer system destroys the decrypted file, in response to situations being detected in the video, the situations being selected from the group consisting of: a device being able to take a picture, a device being able to communicate to other persons, occurrence of more than one viewer, and taking of the viewer.

In yet another embodiment of the present invention, the computer system displays contents of the decrypted file, in response to the encrypted file being decrypted into a decrypted file. The computer system disable a screenshot function and prevent the contents of the decrypted file from being obtained.

In yet another embodiment of the present invention, the computer system causes an application configured to handle the decrypted file to open the decrypted file, in response to the encrypted file being decrypted into a decrypted file. The computer system informs the application to prevent contents of the decrypted file from being obtained. The computer system disables a screenshot function.

In yet another embodiment of the present invention, the computer system determines a number of viewers in the at least one picture after detecting the occurrence of the viewer. The computer system rejects the request, in response to the number of the viewers being more than one.

In yet another embodiment of the present invention, the encrypted file comprises plaintexts, and the plaintexts comprise the at least one facial feature of the intended recipient used for generating the first key, a key generation algorithm and an encryption algorithm for the ciphertexts. Determining the at least one facial feature of the viewer is further based on the at least one facial feature of the intended recipient in the plaintexts. Generating the second key is further based on the key generation algorithm in the plaintexts. Decrypting the encrypted file with the second key is further based on the encryption algorithm in the plaintexts.

In yet another embodiment of the present invention, the encrypted file that is encrypted with the first key is obtained by: the computer system obtaining an original file and a photo of the intended recipient; the computer system determining the at least one facial feature of the intended recipient from the photo; the computer system generating the first key based on the at least one facial feature of the intended recipient; and the computer system encrypting the original file with the first key.

In yet another embodiment of the present invention, the piece of ciphertext is obtained by: the computer system encrypting the predefined information with the first key to get the piece of ciphertext.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
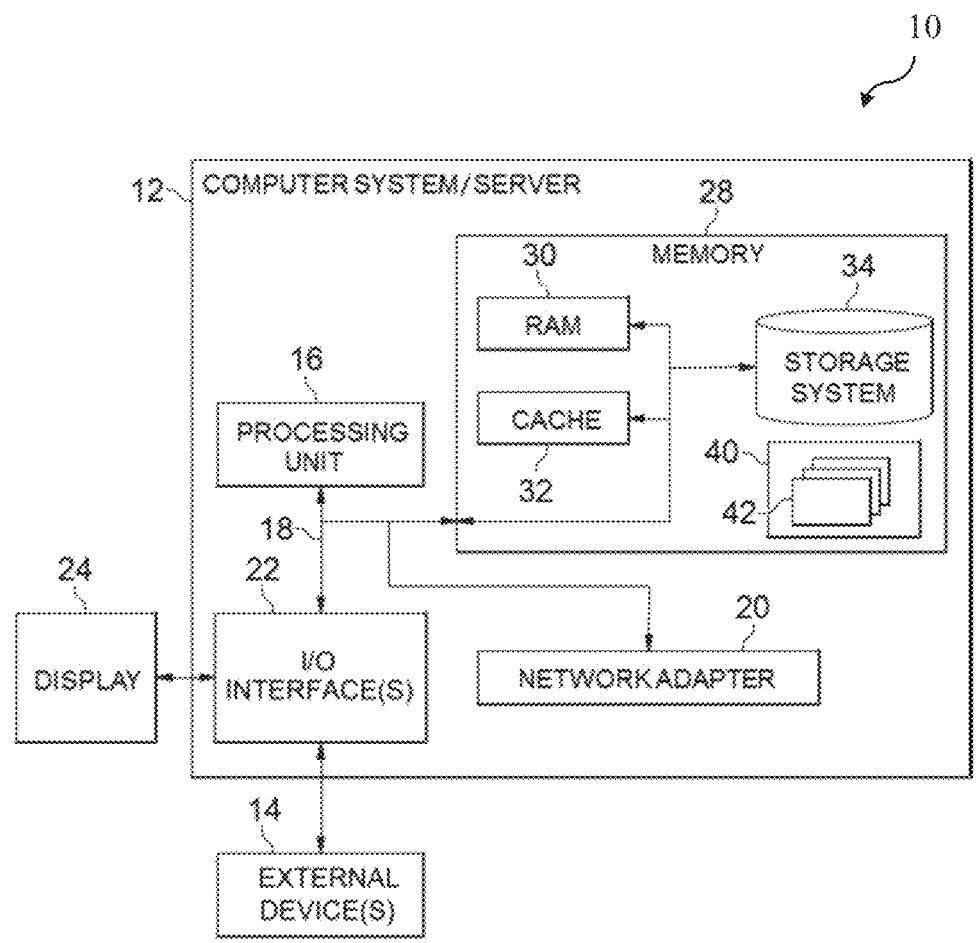
FIG. 1 depicts a cloud computing node, in accordance with one embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
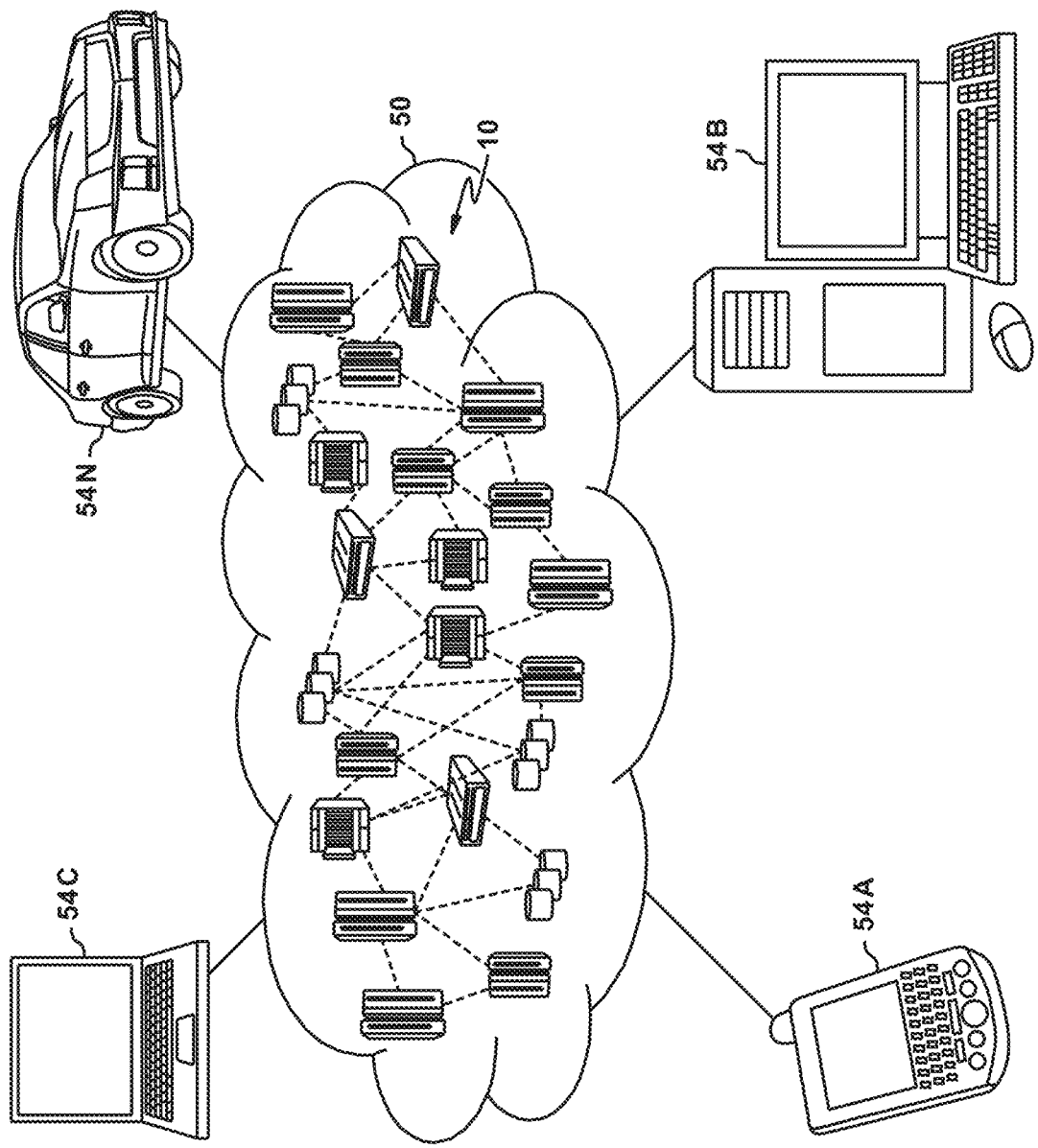
FIG. 2 depicts a cloud computing environment, in accordance with one embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
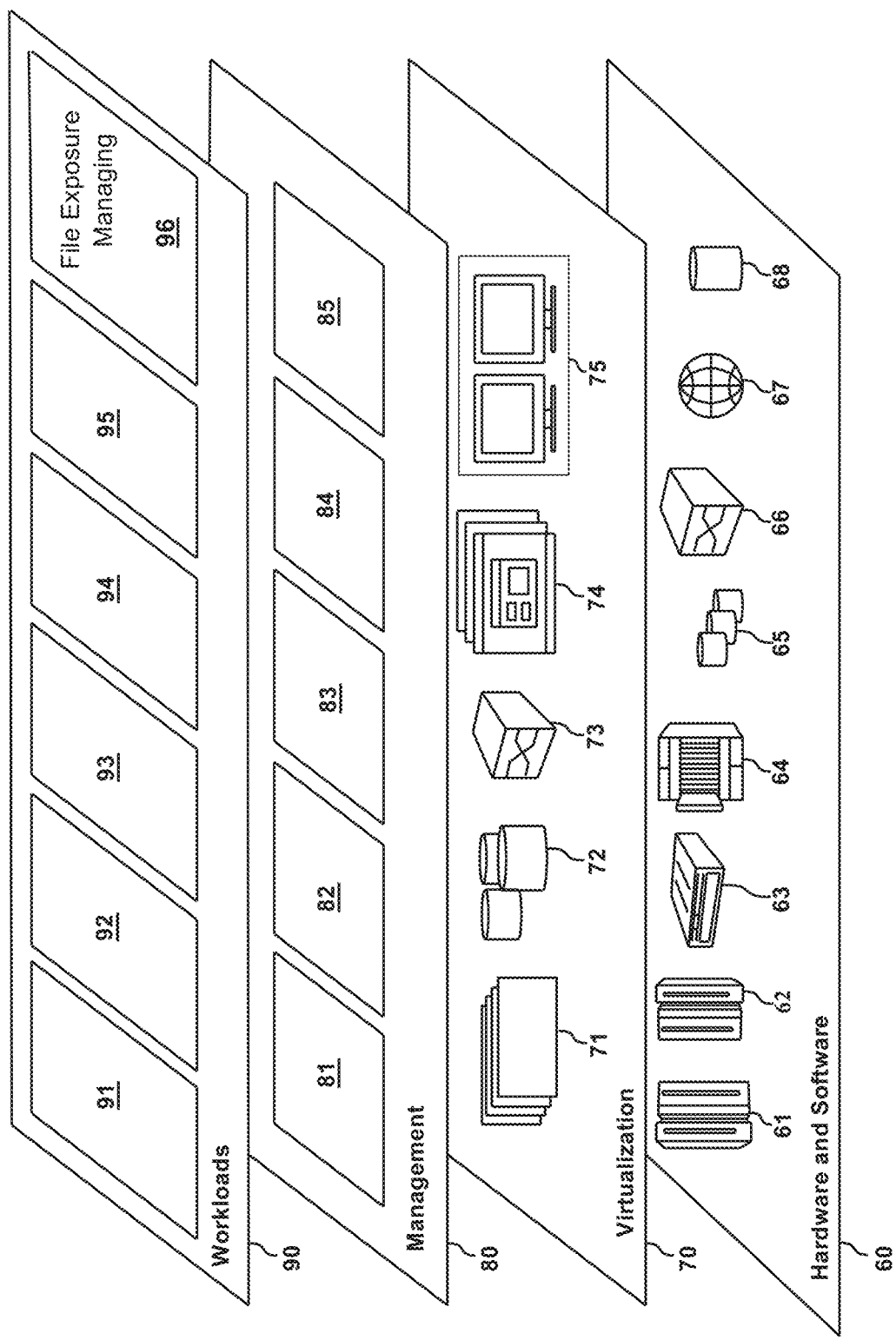
FIG. 3 depicts abstraction model layers, in accordance with one embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and file exposure managing 96.

Now files are always shared among people. Some files, such as images and videos, may be expected to be viewed solely by an intended recipient due to privacy concerns, while some files, such as confidential files, may be requested to be read only by an authorized person because of security considerations.

Embodiments of the present invention provides a method for exposure of files to an intended recipient while preventing others from getting the contents of the files. According to the method, a file to be shared is encrypted with a first key generated from at least one biological feature of the intended recipient, such as facial feature. When a viewer is viewing the file on a device, the viewer's all actions are monitored by a camera on the device based on concurrence of the viewer. When the viewer requests to view the file, the device gets at least one biological feature (such as facial feature) of the viewer corresponding to the at least one biological feature (such as facial feature) of the intended recipient and generates a second key to decrypt the encrypted file if the viewer is the intended recipient. The intended recipient can view the file and above issue (1) can be avoided. During the file viewing process, all physical behaviors and surrounding environment of the intended recipient are monitored by the camera to avoid above issues (3) and (4), and meanwhile, all file electronic sharing actions through the device are disabled to avoid above issue (2).

A file is used as an example to describe embodiments of this invention for simplicity of description, it is straightforward for those skilled in that art that the embodiments of this invention can be applied to a collection of files.

Figure 4:
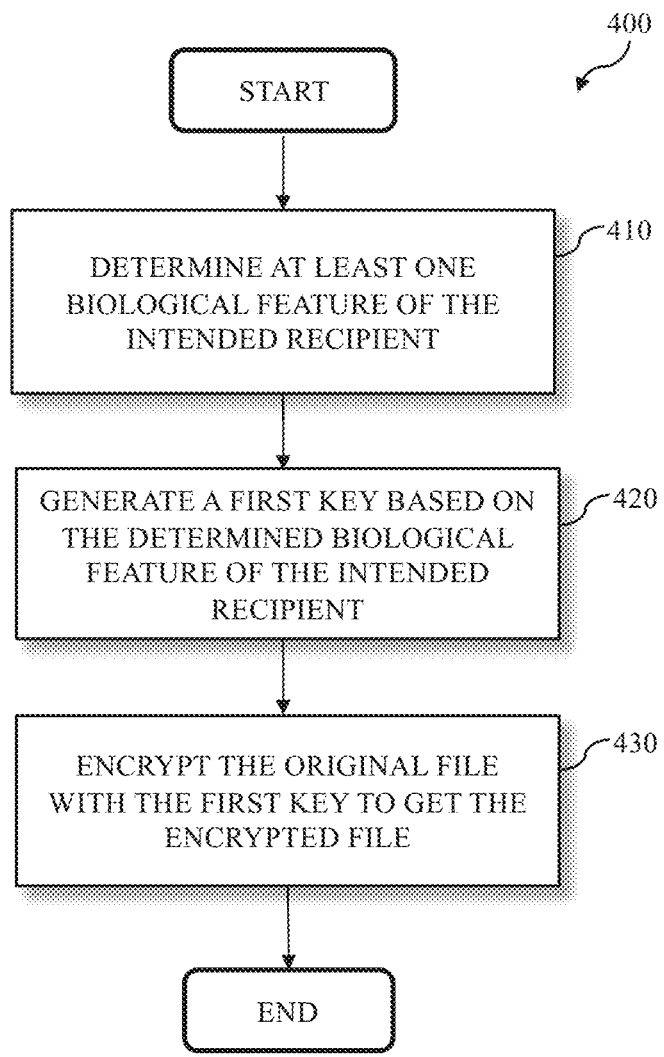
FIG. 4 depicts a schematic flowchart of a method for encrypting an original file using a first key generated from at least one biological feature of an intended recipient, in accordance with one embodiment of the present invention.

FIG. 4 depicts a schematic flowchart of a method 400 for encrypting an original file with a first key generated from at least one biological feature of an intended recipient according to an embodiment of the present disclosure. The intended recipient is an authorized person to view the original file.

At step 410, at least one biological feature of the intended recipient is caused to be captured. In some embodiments, the biological feature comprises facial feature, iris feature, fingerprint feature, voiceprint feature and the like. For example, the at least one biological feature of the intended recipient may be several facial features of the intended recipient, or a composition of several facial features and several fingerprint features of the intended recipient, or any composition of any number of above biological features. In order to capture a special biological feature, a special device is needed. For example, a fingerprint scanner is needed if the fingerprint features are used to generate the first key, etc.

In some embodiments, the at least one biological feature of the intended recipient is selected from at least one facial feature of the intended recipient since a camera is usually configured in a laptop or an intelligent device, then step 410 may be implemented by the following steps. (1) A photo of the intended recipient may be obtained. The photo of the intended recipient may be obtained directly from the intended recipient himself/herself, or from a social network or from a predefined storage, etc. (2) At least one facial feature of the intended recipient may be determined from the photo. The facial feature of the intended recipient can be one facial feature or a collection of a plurality of facial features of the intended recipient. Extraction of the at least one facial feature of the intended recipient can use existing technologies, which are known by those skilled in the art. In some embodiments, the at least one facial feature of the intended recipient can be at least one predefined facial feature. In some embodiments, the facial feature of the intended recipient can be selected from a predefined collection of facial features. For example, there are more than 100 facial features used in face recognition technologies, but only five fix facial feature can be selected. Those skilled in the art may understand that other number of facial features can be selected.

At step 420, a first key is generated based on the determined biological feature of the intended recipient. In some embodiments, a hash value of the determined biological feature of the intended recipient can be used as the first key. In some other embodiments, a ratio of two determined biological features of the intended recipient (such as two digits after the decimal point) can be used as a new biological feature to generate the first key. For example, a ratio of a distance between the centers of two pupils and a distance of two ear tips is 0.5213, then 0.52 can be used as the facial feature of the ratio of the distance between the centers of two pupils and the distance of two ear tips.

At step 430, the original file is encrypted with the first key to get an encrypted file. In some embodiments, predefined information (which will be described later) is encrypted with the first key and then the encrypted information is attached into a predefined location of the encrypted file. In some embodiments, a specific encryption algorithm can be used. In some embodiments, some predefined encryption algorithms can be used for selection, such as DES (Data Encryption Standard), T-DES (Triple-DES), blowfish, IDEA (International Data Encryption Algorithm), RCS (Rivest's cipher or Ron's code), AES (Advanced Encryption Standard), ECC (Elliptic-curve cryptography), etc.

In some embodiments, if the at least one biological feature of the intended recipient used for generating the first key, key generation algorithm and encryption algorithm used for encrypting the original file and obtaining the encrypted file are all predefined or unchangeable, the encrypted file comprises ciphertexts only. In some embodiments, if each of the at least one biological feature of the intended recipient used for generating the first key can be selected from some available biological features, key generation algorithm can be selected from some available key generation algorithms, and encryption algorithm used for encrypting the original file to obtain the encrypted file can be selected from some available encryption algorithms, then the encrypted file may further comprise plaintexts. Here the plaintexts can comprise selected at least one biological feature of the intended recipient used for generating the first key, selected key generation algorithm and selected encryption algorithm. The ciphertexts are obtained by using the above selected parameters to encrypt the original file.

In some embodiment, a special file name extension can be used for an encrypted file to indicate that the encrypted file is encrypted with the first key. In some embodiments, other file attributes can be used to indicate that the file is such an encrypted file.

Then the encrypted file can be sent to the intended recipient through an application, such as an email application, WeChat, and the like, or stored on a storage so that the intended recipient can download it.

Figure 5:
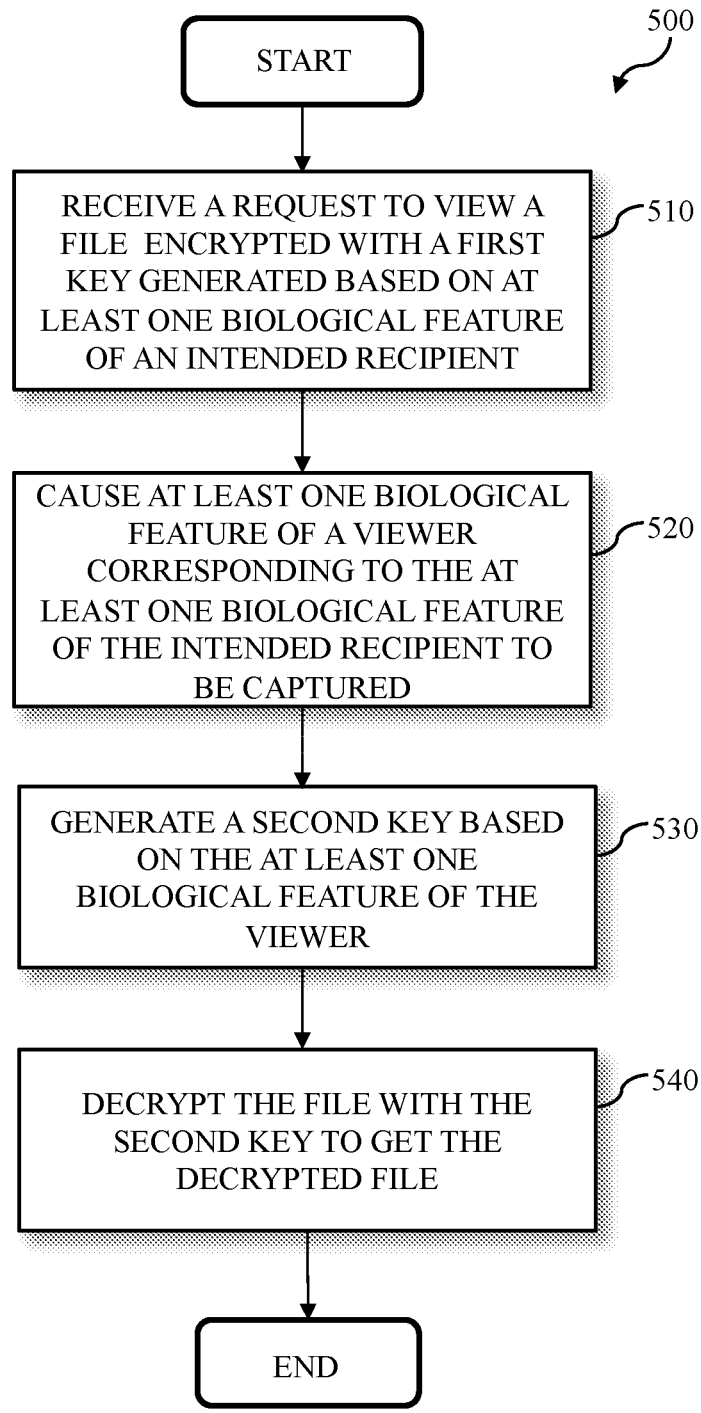
FIG. 5 depicts a schematic flowchart of a method for decrypting a file encrypted using a first key generated from at least one biological feature of an intended recipient, in accordance with one embodiment of the present invention.

FIG. 5 depicts a schematic flowchart of a method 500 for decrypting a file encrypted using a first key generated from at least one biological feature of an intended recipient, in accordance with one embodiment of the present invention. In the process of the method 500, a viewer is trying to view the encrypted file on a device. The viewer may or may not be the intended recipient. Referring to FIG. 5, at step 510, a request to view a file encrypted with a first key generated based on at least one biological feature of an intended recipient is received. As mentioned before, the biological feature comprises facial feature, iris feature, fingerprint feature, voiceprint feature, and the like. Next, at least one biological feature of a viewer corresponding to the at least one biological feature of the intended recipient is caused to be captured at step 520. Then, a second key is generated based on the at least one biological feature of the viewer at step 530. At least, the file is decrypted with the second key in response to the file being able to be decrypted with the second key at step 540.

In some embodiments, the file is decrypted into a memory, because the memory is a temporary storage, and the file contents in the memory will be lost when power failure occurs and also is not able to be viewed without help of a supported application.

For simplicity of description, it is assumed that in the following embodiments, the at least one facial feature of the intended recipient used for generating the first key, key generation algorithm, and encryption algorithm are all predefined, and the encrypted file can comprise ciphertexts only. Those skilled in the art may understand that the encrypted file may comprise ciphertexts and plaintexts. The plaintexts may indicate the selected facial feature of the intended recipient used for generating the first key, the selected key generation algorithm and the selected encryption algorithm. In addition, a method substantial similar to the method 400 can be used to generate the such encrypted file after obtaining the selected facial feature of the intended recipient used for generating the first key, the selected key generation algorithm and the selected encryption algorithm by an owner of the original file. The detailed implementation for obtaining such information is easy to implement for those skilled in the art and is omitted herein.

Figure 6:
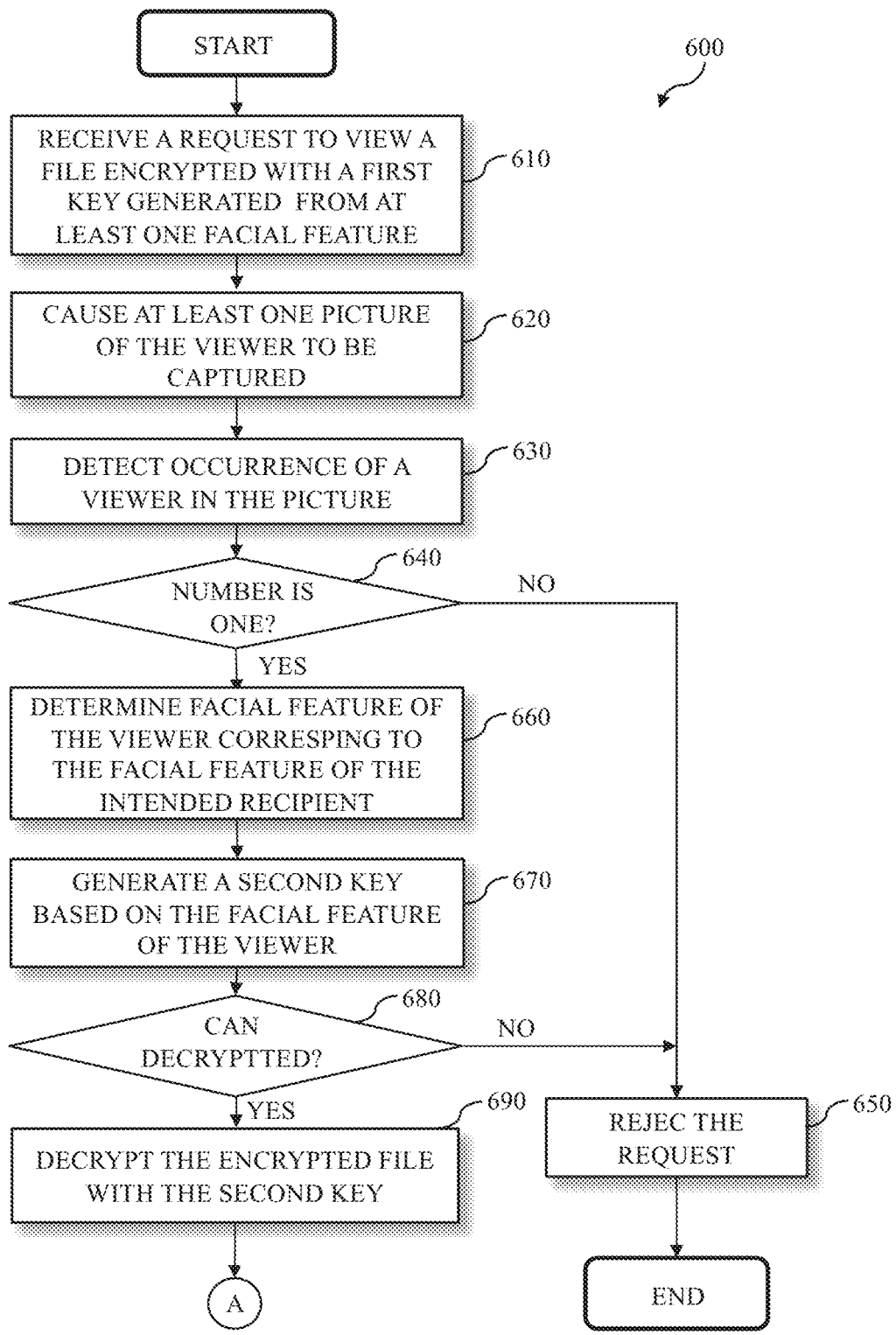
FIG. 6 depicts a schematic flowchart of a method for decrypting a file encrypted using a first key generated from the at least one facial feature of an intended recipient, in accordance with one embodiment of the present invention.

FIG. 6 depicts a schematic flowchart of a method 600 for decrypting a file encrypted using a first key generated from at least one facial feature of an intended recipient, in accordance with one embodiment of the present invention. In the process of the method 600, a viewer is trying to view the encrypted file on a device with a camera. The viewer may or may not be the intended recipient.

At step 610, a request to view the file is received, where the file is encrypted with the first key generated from at least one facial feature of the intended recipient. The intended recipient is an authorized person to view contents of the encrypted file. The encrypted file has been encrypted using the above the method 400.

At step 620, at least one picture of the viewer is caused to be captured. In some embodiments, the viewer may be reminded whether the viewer accepts a request for the viewer to be monitored by the camera. If the reviewer rejects the monitored request, the method is ended. In other words, the viewer cannot view the file. If the viewer accepts to be monitored, at least one picture of the viewer can be captured by the camera.

At step 630, occurrence of a viewer can be detected in the at least one picture of the viewer. The detection can be done using existing object detection/face recognition/tracking technologies in images, the detailed implementation is omitted herein. All faces in the at least one picture of the viewer can be recognized at this step.

At step 640, the number of viewers is determined. In some embodiments, the number of viewers is more than one, in other words, there are more than one viewer trying to view the file. However, the encrypted file is requested to be viewed only by one intended recipient, thus at step 650, the request is rejected. Then, the method 600 is ended. In some embodiments, the viewer may be reminded before the rejection, such as displaying on a screen of the device "only the intended recipient is permitted to view the file!", which is not shown in FIG. 6.

At step 660, if the number of viewers is one, e.g., there is only one viewer, at least one facial feature of the viewer corresponding to the at least one facial feature of the intended recipient is determined based on the at least one picture of the viewer. Extraction of the at least one facial feature of the viewer can be implemented using existing face recognition technologies, and the detailed implementation is omitted herein. The at least one facial feature of the viewer includes but is not limited to visual features, pixel statistical features, face image transform coefficient features, face image algebra features, and the like.

At step 670, a second key is generated based on the determined at least one facial feature of the viewer. The implementation of step 670 is similar to step 430 in FIG. 4, so that the detailed implementation is omitted herein.

At step 680, it is determined whether the encrypted file can be decrypted with the second key. If the determination indicates that the encrypted file cannot be decrypted with the second key, it means that the viewer is not the intended recipient, then the method 600 goes to step 650 to reject the request and the method 600 is ended. In some embodiments, "the viewer is not the intended recipient of the encrypted file" may be displayed on the screen of the device if the encrypted file is not able to be decrypted with the second key. If the determination indicates that the encrypted file can be decrypted with the second key, it means that the viewer is the intended recipient, then the method 600 goes to step 690 in which the encrypted file is decrypted with the second key so that the decrypted file can be viewed by the viewer as the intended recipient.

In some embodiments, predefined information is encrypted and then the encrypted information is attached into a predefined location of the encrypted file. In other words, the encrypted file comprises a piece of ciphertext which is generated by encrypting the predefined information using the first key. The predefined information can be any information well known by both the file generator and the viewer, such as name of the encrypted file, a piece of text such as "Glad to meet you", or a digital number such as "12345678" and the like. The location can be the beginning of the encrypted file, for example, the encrypted predefined information is stored in the first 1K byte of the encrypted file. The location can be the end of the encrypted file or any other predefined location in the encrypted file. Then, the implementation of step 680 can adopt the encrypted information. The piece of ciphertext in the encrypted file can be decrypted first with the second key to get decrypted information. Then, the decrypted information can be compared with the predefined information. If both are the same, it can be determined the encrypted file can be decrypted with the second key; otherwise, it can be determined that the encrypted file cannot be decrypted with the second key. Those skilled in the art may understand that the above determined method can be used for not only the facial features but also any biological features.

In some embodiments, after the second key is generated, the encrypted file may be decrypted with the second key directly into a memory, which is a temporary storage that loses its contents when power is lost. Then, the decrypted file in the memory may be opened based on attribute of the file, such as indicated by a file name extension. For example, if the decrypted file in the memory indicates that it is a pdf file, it can be opened with a pdf viewer application, then it can be determined that the encrypted file can be decrypted with the second key. However, if the decrypted file in the memory cannot be opened by a corresponding application to the file attribute it indicates or the decrypted file in the memory cannot provide its file attribute, it can also be determined that the encrypted file cannot be decrypted with the second key.

The method 600 can be implemented as a stand-alone application or a plug-in of an application; for example, the method 600 can be implemented as a plug-in of an email application. When an email with such an attached encrypted file is received, the plug-in in the email application can decrypt the file per request if the viewer is the intended recipient.

Figure 7:
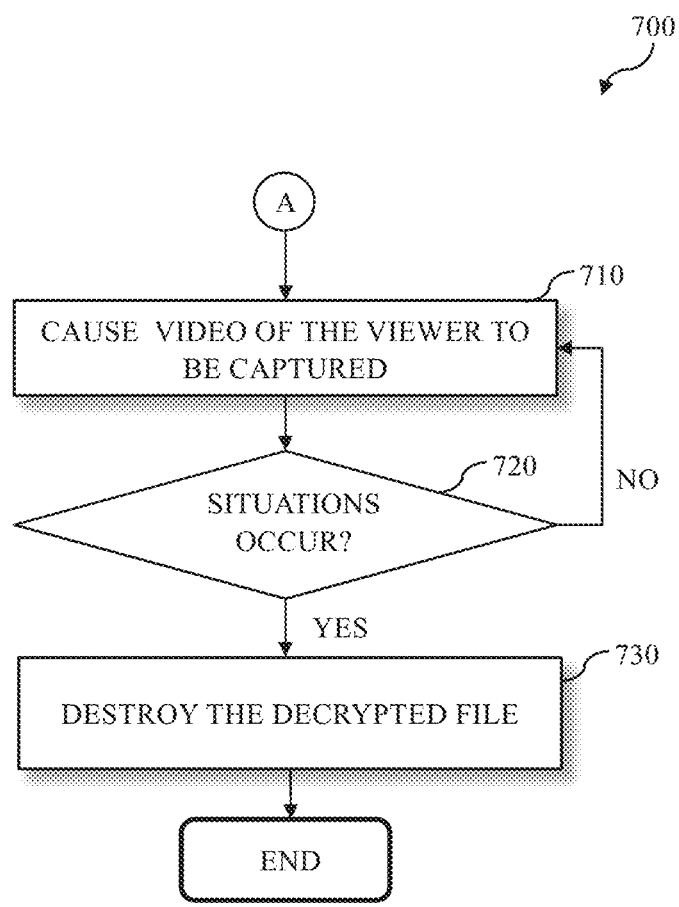
FIG. 7 depicts a schematic flowchart of a method for avoiding illegal exposure of the file by some actions through physical behavior, in accordance with one embodiment of the present invention.

In some embodiments, the method 600 further comprises steps shown in FIG. 7. FIG. 7 depicts a schematic flowchart of a method 700 for avoiding illegal exposure of the file by some actions through physical behavior, in accordance with one embodiment of the present invention. At this time, the camera is enabled and can capture a video. At step 710, a video of viewer is caused to be captured. Here, the video of the viewer may comprise both audios of the viewer and videos of the viewer. At step 720, it is detected whether there is at least one of following in the captured video: (1) A device being able to take pictures. This may mean the intended recipient may take picture of the file on the screen by the device such as a camera. This can be detected using existing object detection technologies. (2) A device being able to communicate to others. This may mean the intended recipient may tell others the content of the file by the device such as a phone. This can be detected using existing object detection technologies. (3) Occurrence of more than one viewer. This may mean either the intended recipient lets others to view the file on the screen or others peek at the file when the intended recipient is viewing the file on the screen. This can be detected using existing object detection/face recognition/face tracking technologies. (4) A talking viewer. This may mean the intended recipient may read out the file for others. This can be detected using existing face recognition/mouth tracking technologies or voice detection technologies. If at least one of above occurs, at step 730, the decrypted file is destroyed to avoid illegal exposure of the file by some actions through physical behavior. If none of above concurs, the method 700 goes back to step 710 to continue to cause the video of the viewer to be captured to check the illegal exposure of the file.

In some embodiments, the video captured by the camera is accessed continuously at step 710 to monitor the illegal exposure of the file closely. In some embodiments, the video captured by the camera is accessed intermittently at step 710, for example, the video is accessed every span which represents random number in the range of 1 to 30 seconds, to save the CPU resource of the system. In some embodiments, the video captured by the camera is accessed periodically at step 710; for example, the video is accessed every 30 seconds, to save the CPU resource of the system, as well as to simplify the design of the system. The parameters in the above embodiments are all exemplary, and those skilled in the art can adopt different parameters as needed.

Figure 8:
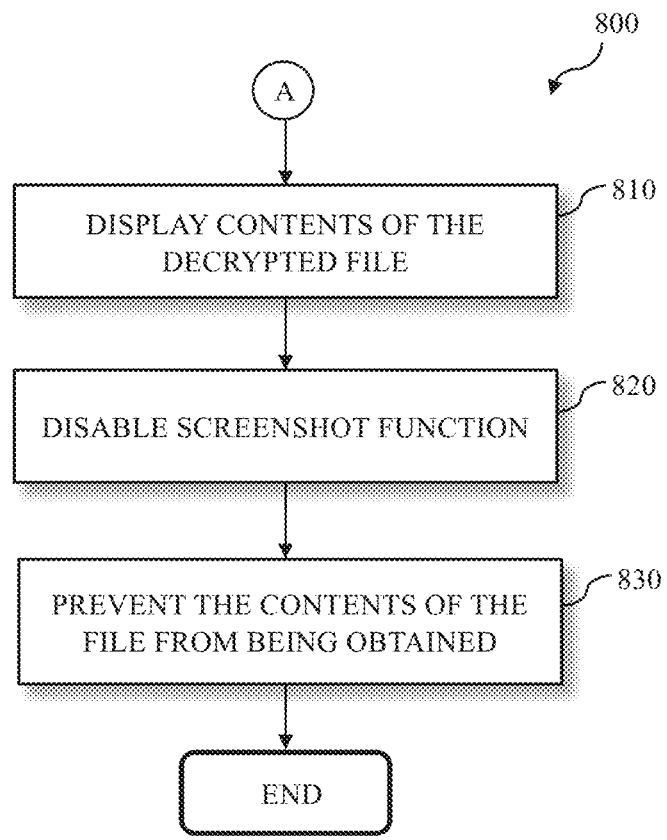
FIG. 8 depicts a schematic flowchart of a method for avoiding illegal exposure of the file by some actions in an electronic device, in accordance with one embodiment of the present invention.

In some embodiments, the method 600 further comprise steps shown in FIG. 8. FIG. 8 depicts a schematic flowchart of a method 800 for avoiding illegal exposure of the file by some actions in an electronic device, in accordance with one embodiment of the present invention. In the method 800, the decrypted file can be directly handled by a component implementing the invention. For example, the invention may be implemented as part of an Email application, and the Email application has an embedded PDF reader. When the decrypted file is a pdf file, the Email application may open the decrypted file directly.

Referring to FIG. 8, at step 810, contents of the decrypted file is displayed on the screen of the device. At step 820, a screenshot function is disabled. In some embodiments, the stand-alone application provides the screenshot function, so the stand-alone application can directly disable the screenshot function. In some embodiments, the stand-alone application does not provide the screenshot function, then the stand-alone application may inform the operating system of the device to disable the screenshot function. At step 830, the contents of the decrypted file is prevented from being obtained outside the stand-alone application. The actions of obtaining the contents of the decrypted file include but are not limited to: cutting or copying contents of the file to a clipboard and then pasting the contents in the clipboard to a new file, sending or forwarding the file, and the like. It can be understood that the steps in FIG. 8 can be executed parallelly with the steps in FIG. 7, and steps 810-830 have no fixed order of execution and can be executed in any order.

Figure 9:
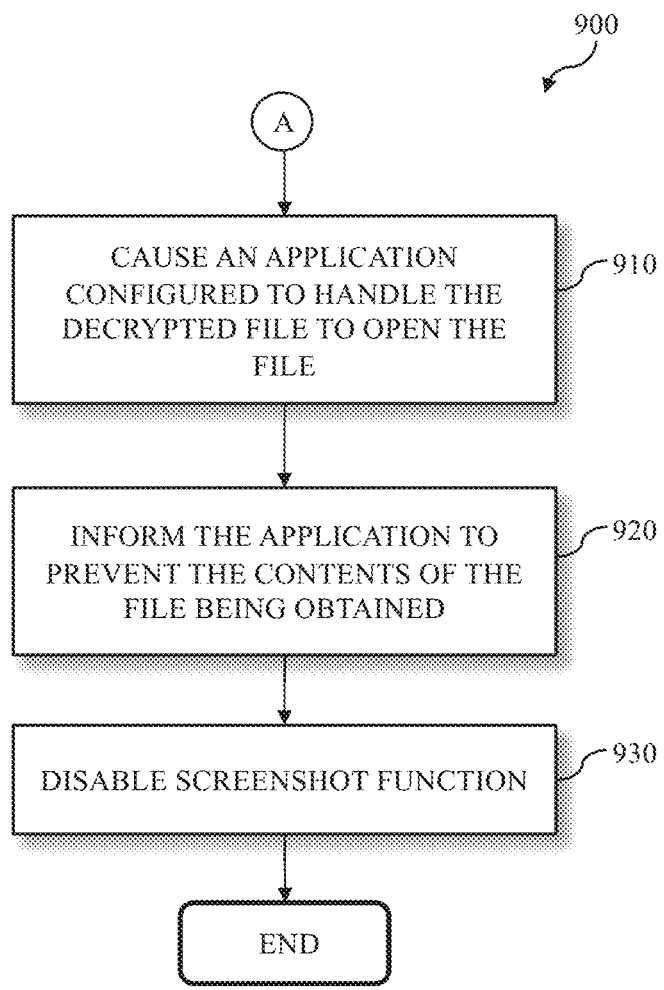
FIG. 9 a schematic flowchart of a method for avoiding illegal exposure of the file by some actions in an electronic device according to an embodiment of the present disclosure, in accordance with another embodiment of the present invention.

In some embodiments, the method 600 further comprise steps shown in FIG. 9. FIG. 9 depicts a schematic flowchart of a method 900 for avoiding illegal exposure of the file by some actions in an electronic device, in accordance with one embodiment of the present invention. In the method 900, the decrypted file cannot be directly handled by a component implementing the invention, but can be directly handled by another application. For example, the invention may be implemented as a plug-in of an email application. The email application cannot handle a .docx document directly but can ask Microsoft Word® to handle the .docx document. When the decrypted file is a .docx file, the email application may ask Microsoft Word® to open the decrypted file.

Referring to FIG. 9, at step 910, the application configured to handle the decrypted file may be caused to open the decrypted file. For example, if the decrypted file is a .docx document, the application configured to handle the decrypted file can be Microsoft Word® application. At step 920, the application configured to handle the decrypted file may be informed to prevent the contents of the decrypted file from being obtained outside the application/the operating system. The actions of obtaining the contents of the decrypted file include but are not limited to: cutting or copying the files to a clipboard and then pasting to a new file, sending or forwarding the file, and the like. At step 930, a screenshot function is disabled. In some embodiments, the application configured to handle the decrypted file provides the screenshot function, so the application can directly disable the screenshot function. In some embodiments, the application configured to handle the decrypted file does not provide the screenshot function, then the application may inform the operating system of the device to disable the screenshot function. It can be understood that the steps in FIG. 9 can be executed parallelly with the steps in FIG. 7, and steps 910-930 have no fixed order of execution and can be executed in any order.

Figure 10:
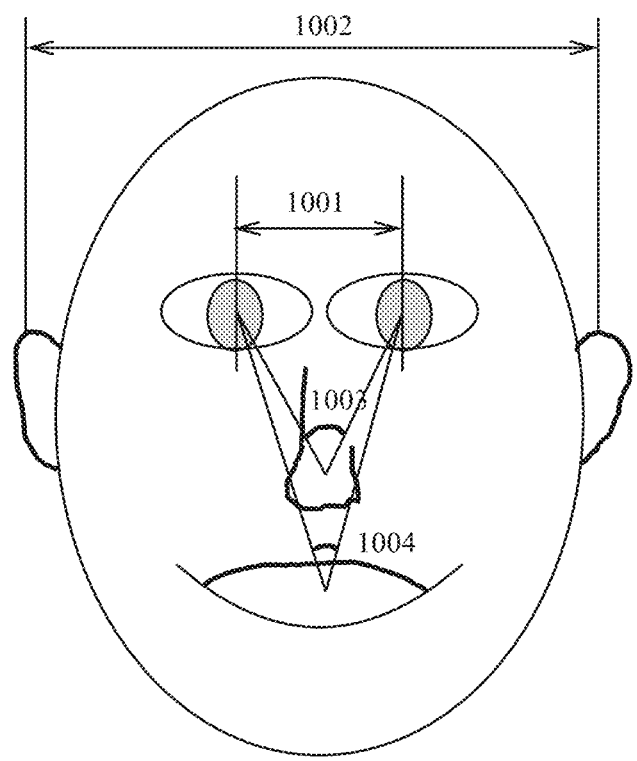
FIG. 10 shows exemplary facial features used to generate the first key, in accordance with another embodiment of the present invention.

FIG. 10 shows exemplary facial features used to generate the first key, in accordance with one embodiment of the present invention. As shown in FIG. 10, a reference number 1001 indicates a distance between centers of two pupils (6.5 cm), a reference number 1002 indicates a distance of two ear tips (12.5 cm), a reference number 1003 indicates an angle at which the centers of two pupils forms with the tip of the nose (66°), and a reference number 1004 indicates an angle at which the centers of two pupils form with the center of the mouth (35°). The four facial features are visual features. Then a set of the exemplary facial feature, such as {1001÷1002, 1003, 1004}, e.g., {0.52, 66, 35} can be used as facial features to generate the first key. In order to keep the values of the facial features consistent, only two digits after decimal point are kept for the feature (1001÷1002) which is represented by a decimal number in this example. Those in the art can understand that he/she can define numerical accuracy of a value of a facial feature as needed. The above locations of a face can be determined using existing face recognition technologies. It should be noted that the above facial features are illustrative, and other facial features can also be used to generate first key.

It should be noted that the processing of file exposure managing according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a computer system, a request to view an encrypted file, wherein the encrypted file is encrypted with a first key generated based on at least one biological feature of an intended recipient, wherein the encrypted file comprises a piece of ciphertext which is generated by encrypting predefined information using the first key;
causing, by the computer system, at least one biological feature of a viewer to be captured, the at least one biological feature corresponding to the at least one biological feature of the intended recipient;
generating, by the computer system, a second key based on the at least one biological feature of the viewer;
decrypting, by the computer system, the piece of ciphertext with the second key to get decrypted information;
determining, by the computer system, the encrypted file being able to be decrypted with the second key, in response to the decrypted information being the same as the predefined information;
decrypting, by the computer system, the encrypted file with the second key;
in response to the encrypted file being decrypted into a decrypted file, causing, by the computer system, a video of the viewer to be captured; and
destroying, by the computer system, the decrypted file, in response to that talking of the viewer in the video is detected, wherein detecting the talking uses face recognition and mouth tracking.

2. The computer-implemented method of claim 1, wherein the at least one biological feature of the intended recipient and the at least one biological feature of the viewer are selected from the group consisting of: a facial feature, an iris feature, a fingerprint feature, and a voiceprint feature.

3. The computer-implemented method of claim 1, the method further comprising:
comparing, by the computer system, the decrypted information with the predefined information.

4. The computer-implemented method of claim 3, wherein the piece of ciphertext is obtained by:
encrypting, by the computer system, the predefined information with the first key to get the piece of ciphertext.

5. The computer-implemented method of claim 1, further comprising:
rejecting, by the computer system, the request to view the encrypted file by the viewer, in response to the encrypted file being not able to be decrypted with the second key.

6. The computer-implemented method of claim 1, wherein the encrypted file is decrypted into a memory.

7. The computer-implemented method of claim 1, wherein the at least one biological feature comprises a facial feature, and wherein causing the at least one biological feature of the viewer to be captured comprises:
causing, by the computer system, at least one picture of the viewer to be captured;
detecting, by the computer system, occurrence of the viewer in the at least one picture; and
determining, by the computer system, at least one facial feature of the viewer from the at least one picture of the viewer, the at least one biological feature of the viewer corresponding to at least one facial feature of the intended recipient.

8. The computer-implemented method of claim 7, further comprising:
in response to the encrypted file being decrypted into a decrypted file, causing, by the computer system, a video of the viewer to be captured; and
destroying, by the computer system, the decrypted file, in response to situations being detected in the video, the situations being selected from the group consisting of: a device being able to take a picture and a device being able to communicate to other persons.

9. The computer-implemented method of claim 7, further comprising:
determining, by the computer system, a number of viewers in the at least one picture after detecting the occurrence of the viewer; and
rejecting, by the computer system, the request, in response to the number of the viewers being more than one.

10. The computer-implemented method of claim 7, wherein the encrypted file comprises plaintexts, the plaintexts comprise the at least one facial feature of the intended recipient used for generating the first key, a key generation algorithm and an encryption algorithm for ciphertexts, wherein determining the at least one facial feature of the viewer is further based on the at least one facial feature of the intended recipient in the plaintexts, wherein generating the second key is further based on the key generation algorithm in the plaintexts, and wherein decrypting the encrypted file with the second key is further based on the encryption algorithm in the plaintexts.

11. The computer-implemented method of claim 7, wherein the encrypted file that is encrypted with the first key is obtained by:
obtaining, by the computer system, an original file and a photo of the intended recipient;
determining, by the computer system, the at least one facial feature of the intended recipient from the photo;
generating, by the computer system, the first key based on the at least one facial feature of the intended recipient; and
encrypting, by the computer system, the original file with the first key.

12. The computer-implemented method of claim 1, further comprising:
in response to the encrypted file being decrypted into a decrypted file, displaying, by the computer system, contents of the decrypted file;
disabling, by the computer system, a screenshot function; and
preventing, by the computer system, the contents of the decrypted file from being obtained.

13. The computer-implemented method of claim 1, further comprising:
in response to the encrypted file being decrypted into a decrypted file, causing, by the computer system, an application configured to handle the decrypted file to open the decrypted file;

informing, by the computer system, the application to prevent contents of the decrypted file from being obtained; and disabling, by the computer system, a screenshot function.

14. A computer system, comprising:
one or more processors, one or more non-transitory computer readable tangible storage devices, and program instructions stored on at least one of the one or more computer readable tangible storage devices for execution by at least one of the one or more processors, the program instructions executable to perform:

receiving a request to view an encrypted file, wherein the encrypted file that is encrypted with a first key generated based on at least one biological feature of an intended recipient, wherein the encrypted file comprises a piece of ciphertext which is generated by encrypting predefined information using the first key;

causing at least one biological feature of a viewer to be captured, the at least one biological feature corresponding to the at least one biological feature of the intended recipient;

generating a second key based on the at least one biological feature of the viewer;

decrypting the piece of ciphertext with the second key to get decrypted information;

determining the encrypted file being able to be decrypted with the second key, in response to the decrypted information being the same as the predefined information;

decrypting the encrypted file with the second key;

in response to the encrypted file being decrypted into a decrypted file, causing a video of the viewer to be captured; and destroying the decrypted file, in response to that talking of the viewer in the video is detected, wherein detecting the talking uses face recognition and mouth tracking.

15. The computer system of claim 14, wherein the at least one biological feature of the intended recipient and he at least one biological feature of the viewer are selected from the group consisting of: a facial feature, an iris feature, a fingerprint feature, and a voiceprint feature.

16. The computer system of claim 14, the program instructions further executable to perform:
comparing the decrypted information with the predefined information.

17. The computer system of claim 14, wherein the at least one biological feature comprises a facial feature, and wherein causing the at least one biological feature of the viewer to be captured comprises:
causing at least one picture of the viewer to be captured;
detecting occurrence of the viewer in the at least one picture; and
determining at least one facial feature of the viewer from the at least one picture of the viewer, the at least one facial feature of the viewer corresponding to at least one facial feature of the intended recipient.

18. The computer system of claim 17, the program instructions further executable to perform:
in response to the encrypted file being decrypted into a decrypted file, causing a video of the viewer to be captured; and
destroying the decrypted file, in response to situations being detected in the video, the situations being selected from the group consisting of: a device being able to take a picture and a device being able to communicate to other persons.

19. The computer system of claim 17, wherein the encrypted file comprises plaintexts, the plaintexts comprise the at least one facial feature of the intended recipient used for generating the first key, a key generation algorithm and an encryption algorithm for ciphertexts, wherein determining the at least one facial feature of the viewer is further based on the at least one facial feature of the intended recipient in the plaintexts, wherein generating the second key is further based on the key generation algorithm in the plaintexts, and wherein decrypting the encrypted file with the second key is further based on the encryption algorithm in the plaintexts.

20. A computer program product, the computer program product comprising one or more non-transitory computer-readable tangible storage devices and program instructions stored on at least one of the one or more computer-readable tangible storage devices, the program instructions executable to perform:

receiving a request to view an encrypted file, wherein the encrypted file that is encrypted with a first key generated based on at least one biological feature of an intended recipient, wherein the encrypted file comprises a piece of ciphertext which is generated by encrypting predefined information using the first key;

causing at least one biological feature of a viewer to be captured, the at least one biological feature corresponding to the at least one biological feature of the intended recipient;

generating a second key based on the at least one biological feature of the viewer;

decrypting the piece of ciphertext with the second key to get decrypted information;

determining the encrypted file being able to be decrypted with the second key, in response to the decrypted information being the same as the predefined information;

decrypting the encrypted file with the second key;

in response to the encrypted file being decrypted into a decrypted file, causing a video of the viewer to be captured; and destroying the decrypted file, in response to that talking of the viewer in the video is detected, wherein detecting the talking uses face recognition and mouth tracking.

21. The computer program product of claim 20, wherein the at least one biological feature of the intended recipient and he at least one biological feature of the viewer are selected from the group consisting of: a facial feature, an iris feature, a fingerprint feature, and a voiceprint feature.

22. The computer program product of claim 20, the program instructions executable to perform:
comparing the decrypted information with the predefined information.

23. The computer program product of claim 20, wherein the at least one biological feature comprises a facial feature, and wherein causing the at least one biological feature of the viewer to be captured comprises:
causing at least one picture of the viewer to be captured;
detecting occurrence of the viewer in the at least one picture; and
determining at least one facial feature of the viewer from the at least one picture of the viewer, the at least one facial feature of the viewer corresponding to at least one facial feature of the intended recipient.

24. The computer program product of claim 23, the program instructions further executable to perform:
- in response to the encrypted file being decrypted into a decrypted file, causing a video of the viewer to be captured; and
- destroying the decrypted file, in response to situations being detected in the video, the situations being selected from the group consisting of: a device being able to take a picture and a device being able to communicate to other persons.

25. The computer program product of claim 23, wherein the encrypted file comprises plaintexts, the plaintexts comprise the at least one facial feature of the intended recipient used for generating the first key, a key generation algorithm and an encryption algorithm for ciphertexts, wherein determining the at least one facial feature of the viewer is further based on the at least one facial feature of the intended recipient in the plaintexts, wherein generating the second key is further based on the key generation algorithm in the plaintexts, and wherein decrypting the encrypted file with the second key is further based on the encryption algorithm in the plaintexts.

\* \* \* \* \*